Fig.1

April 13, 1937.  S. R. HOWARD ET AL  2,076,640
PACKAGING MACHINE
Filed Dec. 6, 1932   12 Sheets-Sheet 7

INVENTORS
Stanley R. Howard
BY Gustaf W. Anderson
J. Stanley Churchill
ATTORNEY

April 13, 1937.  S. R. HOWARD ET AL  2,076,640
PACKAGING MACHINE
Filed Dec. 6, 1932  12 Sheets-Sheet 8

INVENTORS
Stanley R. Howard
BY Gustaf W. Anderson
J. Stanley Churchill
ATTORNEY

April 13, 1937.  S. R. HOWARD ET AL  2,076,640
PACKAGING MACHINE
Filed Dec. 6, 1932    12 Sheets-Sheet 12

INVENTORS
Stanley R. Howard
BY Gustaf W. Anderson
J. Stanley Churchill
ATTORNEY

Patented Apr. 13, 1937

2,076,640

UNITED STATES PATENT OFFICE 2,076,640

PACKAGING MACHINE

Stanley R. Howard, East Milton, and Gustaf Waldemar Anderson, North Quincy, Mass., assignors to Pneumatic Scale Corporation, Limited, Quincy, Mass., a corporation of Massachusetts Application December 6, 1932, Serial No. 645,908

7 Claims. (Cl. 249—59)

This invention relates to a packaging machine.

One object of the invention is to provide a novel and improved packaging machine adapted to package flowable solid material in a rapid, economical and superior manner.

Another object of the invention is to provide a novel and improved weighing machine adapted to handle, weigh and package flowable solid material in a rapid, economical and superior manner.

With these general objects in view and such others as may hereinafter appear, the invention consists in the packaging machine, the weighing machine, and in the various structures, arrangements and combinations of parts hereinafter described and particularly defined in the claims at the end of this specification.

In the drawings illustrating the preferred embodiment of the invention, Fig. 20 is a detail in section to be referred to; Fig. 32 is a wiring diagram to be referred to.

Referring now to the drawings, in the illustrated machine four duplicate units are operatively mounted upon a frame 10. Each unit includes mechanism for withdrawing flowable solid material from a bulk supply and weighing the same. Each unit is further provided with mechanism for compressing the weighed load and introducing it into a container. The various operations of the weighing end of the machine are performed within a given cycle in the operation of the machine, and the operation of the various units are so related that before the machine can start upon a succeeding cycle, each unit must have completed all of its own individual weighing operations, and when the last scale has made its weight, the material is discharged by all of the units into the mechanism by which it is compressed and delivered into the containers. The compressing mechanism in the illustrated machine and the delivery of the material into the containers of the various units operate in timed relation.

Figures 3, 4:
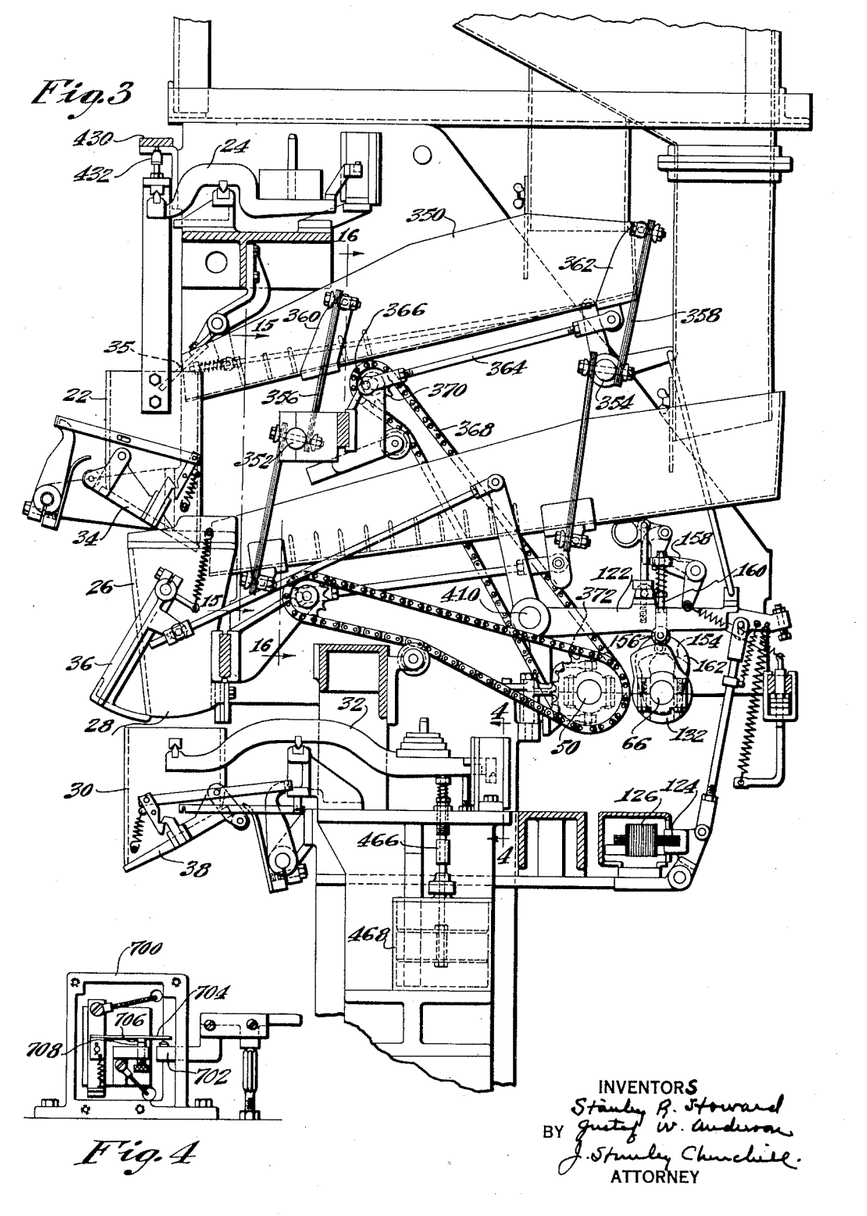
Fig. 3 is a vertical sectional detail through one of the units of the machine illustrating the mechanism for feeding and weighing the material.
Fig. 4 is a detail taken on the line 4—4 of Fig. 3, illustrating an electrical control mechanism operated by the scale.

The material to be packaged is delivered into a hopper for storing a bulk supply thereof, and provision is made for withdrawing the material from the hopper in a plurality of primary load streams and also in a plurality of final load or drip streams. The illustrated machine comprises four units assembled in the single machine, and except as will be hereinafter pointed out, one unit is a duplicate of another, and for convenience of illustration and description, the mechanism of only one unit has been illustrated in detail and will be herein described. Each unit is provided with a primary load conduit and with a final load or drip conduit, and the primary load stream delivers material into a primary load bucket 22 suspended, as will be described, upon a scale beam 24, as shown in Fig. 3. The final load or drip stream discharges into an intermediate bucket 26 arranged beneath the primary load bucket 22. The intermediate bucket 26 is provided with a discharge opening 28 by which its contents may at the proper time in the operation of the machine be discharged into a final load bucket 30 suspended upon a second scale beam 32, as shown in Fig. 3. All three buckets 22, 26, 30, are provided with gates 34, 36, 38, closing the bottoms thereof arranged to be operated through mechanism to be described, so that during the operation of the machine the primary load stream is weighed in the upper bucket 22, and when the scale beam 24 makes its weight, the flow of the primary load stream is cut off by the gate 35. Thereafter the primary load bucket 22 retains its load until during the subsequent operation of the machine the load which had previously been deposited in the final weight bucket 30 reaches its predetermined weight, as material is fed by the final weight stream through the opened bottom 28 of the intermediate bucket 26, whereupon the finally weighed load in the final weight bucket 30 is dumped and the gate 36 is moved to close the bottom of the intermediate bucket 26, and thereafter the primary load is dumped from the upper bucket 22 into the intermediate bucket 26. The intermediate bucket 26 is useful for receiving the primary load at the time when the final load bucket is being dumped. This enables time to be gained in the operation of the machine and affords a cut-off of the material being fed in close proximity to the final weight bucket, thus contributing to the accuracy of the operation of the machine.

When all four units have completed the described operations so that all of the final weight scales 32 of the different units have made their weights, then the weighed loads are dumped from the final weight buckets 30 and are delivered into operative relation to the mechanism for performing the compression of the loads and the delivery of the compressed loads into the containers 45, as will be described. During the operation of the machine, while the foregoing weighing movements are being performed, provision is made for moving the empty containers or packages 45 into a position to receive the weighed and compressed loads and to convey from the machine those containers or packages 45 which have been filled.

In the operation of the illustrated machine, assuming the incoming conveyor 47 to be supplied with containers 45, the cycle of operation of the machine commences when and only when all of the scales 24 and 32 have completed their weights. As herein shown, the machine is controlled by a one-revolution clutch 40 including a pawl 62 and ratchet 60, and provision is made for holding the nose of the pawl 62 from engagement with the ratchet 60 until a condition obtains in which empty containers 45 are against the stops 500 and 502 in the incoming conveyor 47, so that there will be containers 45 in position ready to be filled during a subsequent part of the cycle of operation of the machine, and also until all of the scales of the several units making up the machine have completed their weights and tripped.

Figure 1:
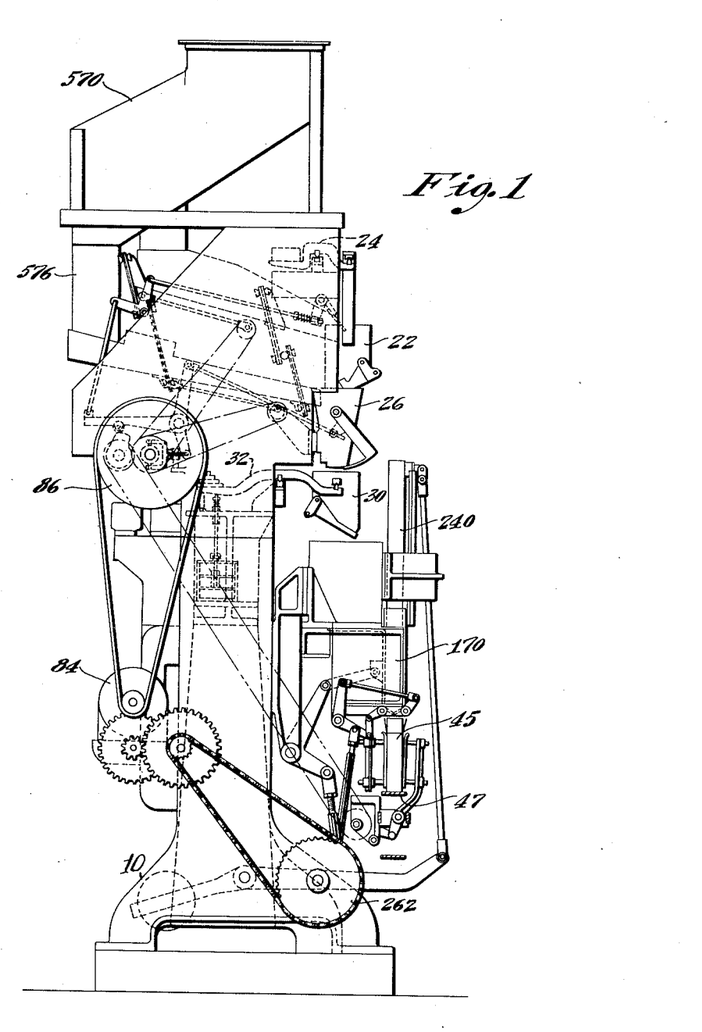
Fig. 1 is an end elevation of a weighing machine embodying the present invention.
Figure 2:
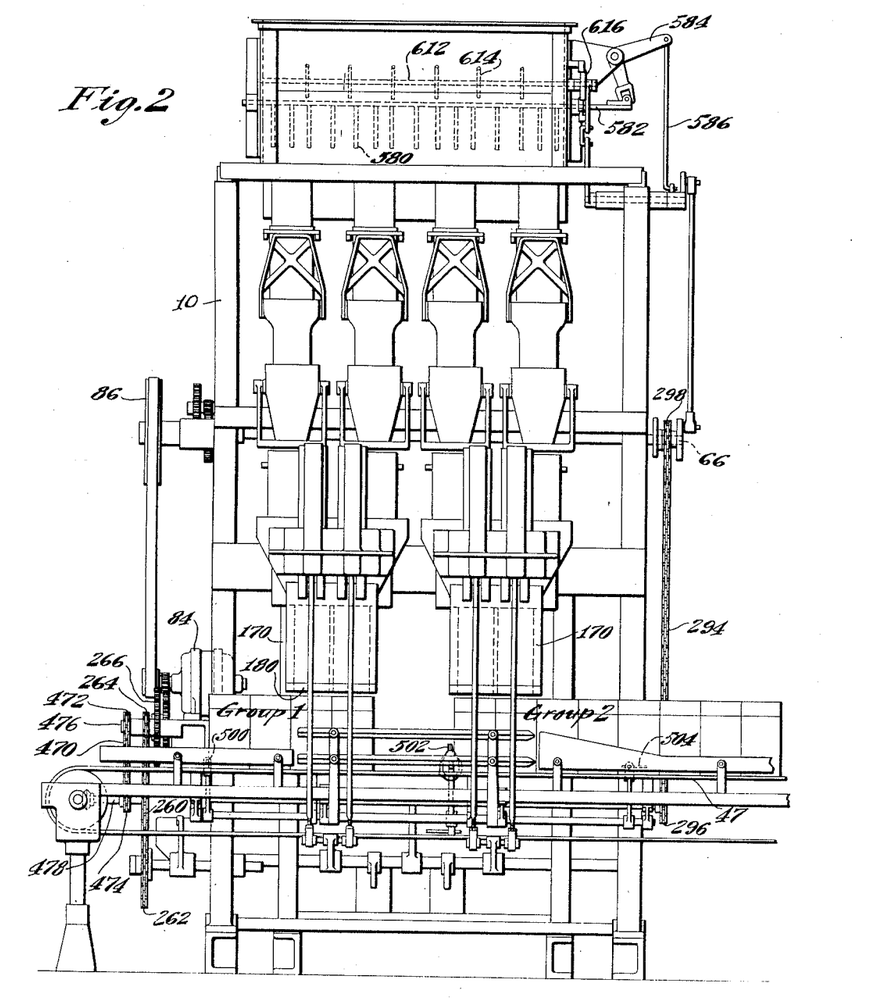
Fig. 2 is a front elevation of the machine shown in Fig. 1.
Figures 7, 8, 9, 10:
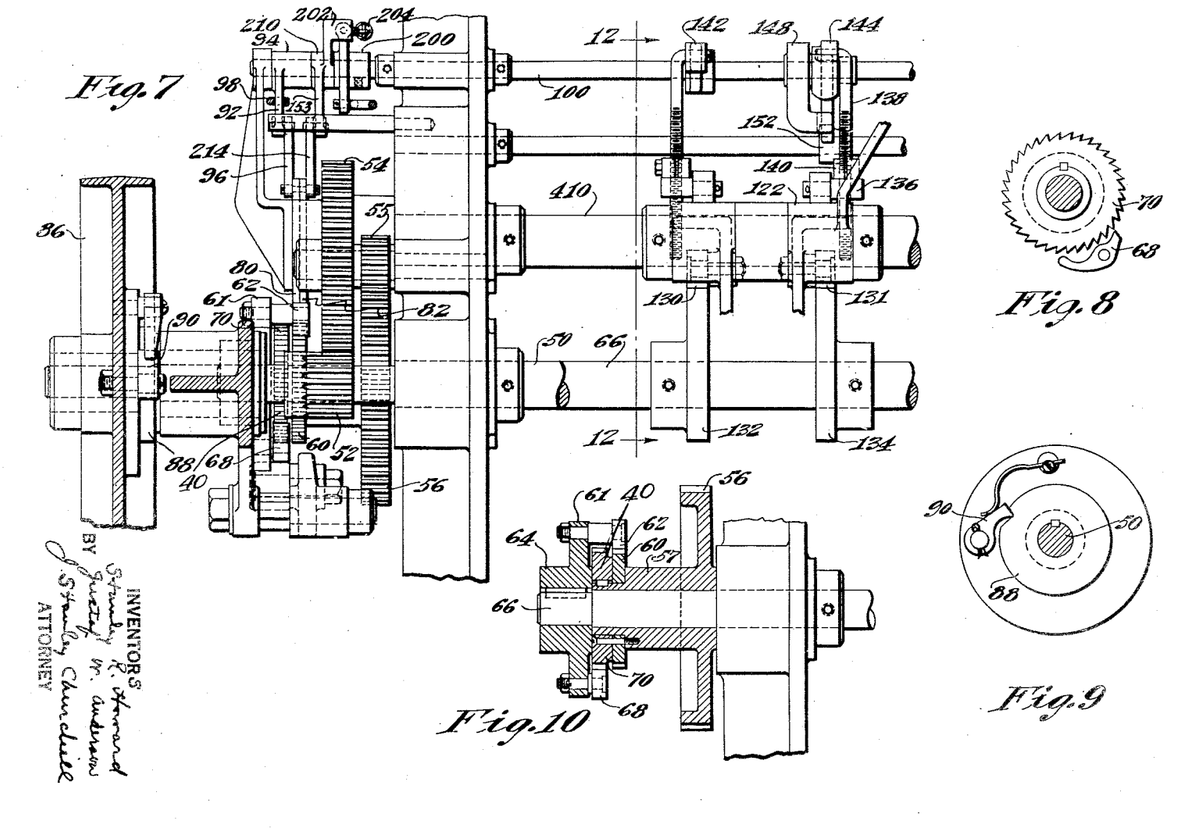
Fig. 7 is a view partly in section and partly in front elevation of the main driving mechanism for operating the weighing end of the machine.
Figs. 8 and 9 are details in elevation of parts of the driving mechanism shown in Fig. 7.
Fig. 10 is a sectional detail of a portion of the driving mechanism shown in Fig. 7.
Figures 11, 12:
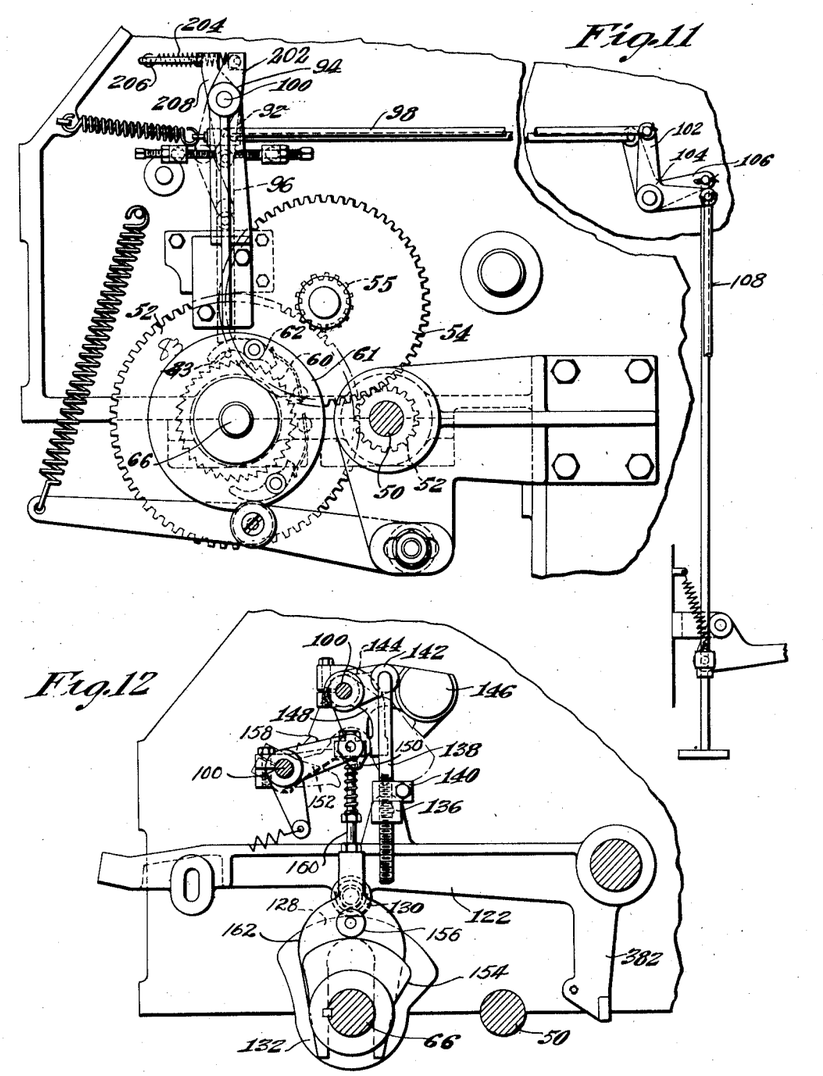
Fig. 11 is a side elevation of a portion of the mechanism shown in Fig. 7.
Fig. 12 is a sectional detail taken on the line 12—12 of Fig. 7.

Referring now more particularly to Figs. 2, 7 and 11, the machine is provided with a motor 84 belted to a driving pulley 86 and the latter is operatively connected to the main driving ratchet 60 shown in Fig. 7, through a one-tooth ratchet 88 and pawl 90 designed to prevent reversal of the machine, as shown in Fig. 9. The pawl 90 is carried by the web of the pulley 86 and the ratchet 88 is keyed upon a shaft 50 upon which a pinion 52 is mounted. The rotations of the pinion 52 are transmitted through the gear 54, pinion 55 and gear 56. As shown in detail in Fig. 10, the gear 56 is provided with a hub 57 having secured thereon the main driving ratchet 60. The main driving pawl 62 is mounted upon a pawl carrier 61 formed upon a hub 64 keyed to the main cam shaft 66. The gear 56 is of course free upon the cam shaft 66. The pawl carrier 61 is further provided with a second pawl 68 cooperating with a second ratchet 70 secured to the sleeve 57 of the gear 56, and the pawl 68 and ratchet 70 cooperate to prevent reverse movement of the cam shaft 66.

Provision is made for holding the nose of the pawl 62 out of engagement with the ratchet 60 until the above described conditions have been obtained, namely, that the containers or packages 45 are present in the incoming conveyor 47 in a position ready to be moved into filling position, and also that all of the scale beams of the various units have made their final weights, and as herein shown two slide members 80, 82 are held, as will be described, in their normal position in engagement with the tail of the pawl 62 holding it against the stop pin 83 so as to prevent the nose of the pawl 62 from engaging with the teeth of the ratchet 60. The slide members 80, 82 are operatively connected to and form a part of conveyor control mechanism, and also a part of both scale and manual control mechanism, as will be described.

Figures 21, 22, 23, 24, 25:
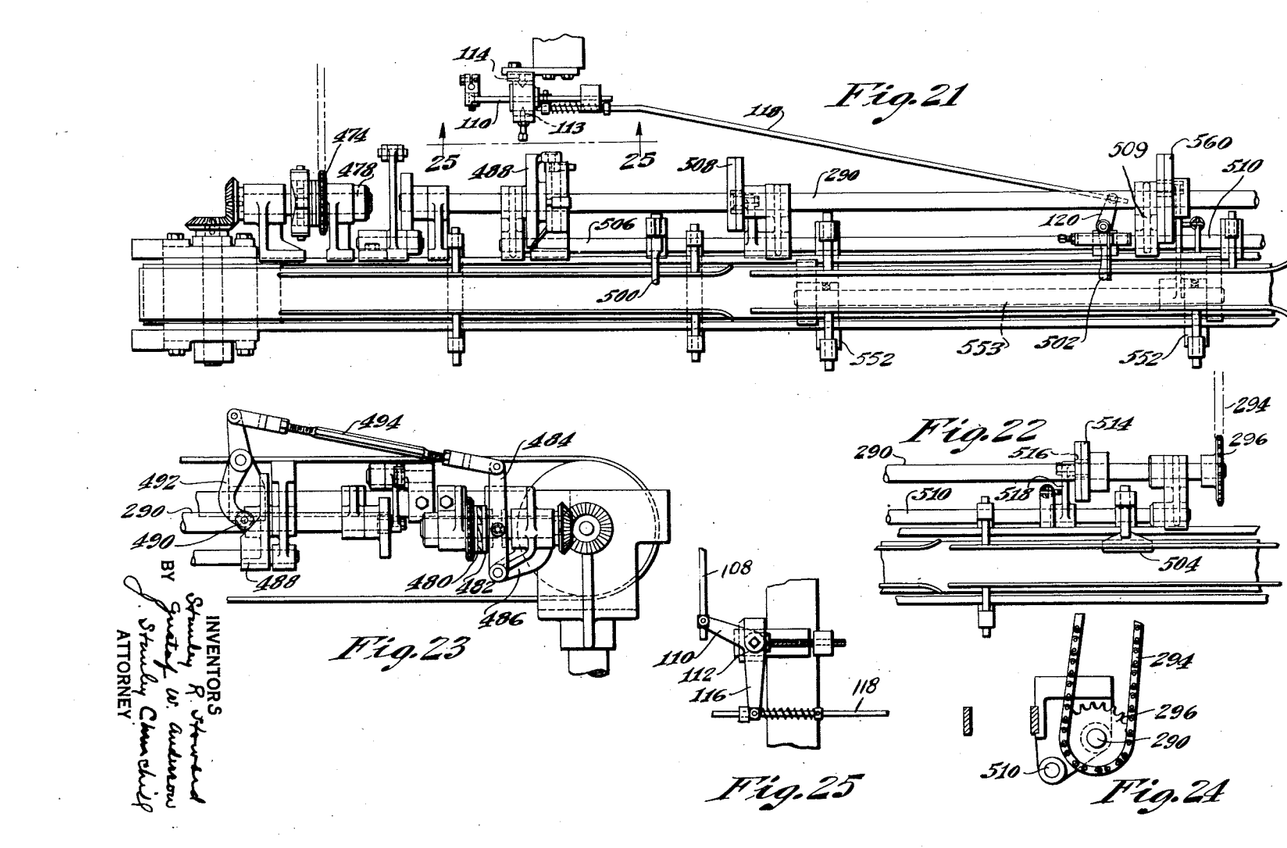
Figs. 21 and 22 are plan views of the conveyor.
Fig. 23 is a rear elevation of the conveyor driving mechanism.
Fig. 24 is an end elevation of a control shaft forming a part of the conveyor driving mechanism.
Fig. 25 is a front elevation of part of the mechanism shown in Fig. 21 viewed from the arrows 25, 25.

The conveyor 47 is driven to move the containers or packages from right to left, viewing Fig. 2, and in order to prevent the operation of the machine, unless a line of empty containers or packages 45 are brought by the conveyor 47 into operative engagement with the stop 502 (see Fig. 21), the slide member 80 is operatively connected with the stop 502 through the following connections. A toggle is provided including an arm 92 fast to a hub 94 free upon a shaft 100, and a second arm 96. The arm 92 of the toggle is connected by a link 98 to one arm 102 of a bell crank 104, the second arm 106 of which is also connected by a vertical link 108 to one arm 110 of another bell crank 112. This bell crank 112 is mounted upon trunnion bearings 113, 114, as shown in Fig. 21, and the second arm 116 of the bell crank is connected with a lever 120 by a link or connecting rod 118.

Referring now more particularly to Figs. 3, 7, 11 and 12, provision is made for controlling the various mechanisms entering into the operation of the weighing end of the machine. In the entire machine each weighing unit comprises an upper scale bucket 22, a lower scale bucket 30, and the intermediate bucket 26. For purposes of illustration, and for convenience of description, the structure and mode of operation of the control mechanisms will be described with special reference to one weighing unit including an upper scale bucket 22, a lower scale bucket 30, and an intermediate bucket 26.

In the operation of the machine, the second slide member 82 is arranged to be lifted from the tail of the pawl 62 to permit the ratchet 60 to drive the pawl 62 through one revolution by a control shaft 100 which is arranged to be oscillated in one direction by the weight of certain parts attached thereto, as will be described, and to effect through connections between the shaft 100 and the slide 82 the lifting of the latter from engagement with the tail of the pawl 62. After this has happened, the shaft 100 is returned to its initial position through the operation of mechanism to be described.

In each cycle of operation of the machine, immediately after the pawl 62 has been permitted to engage the ratchet 60 by lifting the slide 82, the pawl 62 is, as above described, carried through one revolution and operates through the driving connections above described to effect rotation of the cam shaft 66 through one revolution. The cam shaft 66 is operatively connected through one set of mechanism with both the gate 38 for the lower scale bucket 30 and also for the gate 34 for the upper scale bucket 22, and operates to open and close these gates simultaneously.

In addition, the cam shaft 66 is operatively connected through different sets of mechanism with the gate 36 for the intermediate bucket 26, with the mechanism for effecting vibration of both the primary and drip conduits operating to cut off and initiate the vibration of the primary and drip conduits. In addition, the cam shaft 66 also controls the opening and shutting of the gate 35 controlling the delivery of the primary stream into the primary load bucket 22.

Provision is also made for preventing the slide 82 from being lifted to set in motion the cam shaft 66 until all of the scales including the upper and lower scales 24 and 32 respectively, of all units have made their weights, and through the mechanism described to effect the opening of the gates 34 and 38 for dumping the final and primary loads and to effect the subsequent closing thereof. Immediately thereafter the cam shaft 66 effects the initiation of the vibration of the primary and drip load conduits and effects opening of the gate 35 for controlling the primary load stream and also the opening of the gate 36 permitting the intermediate load to fall into the final weight bucket 30. For this purpose, as herein shown, the movement of the shaft 100 in the direction to effect raising of the slide 82 to enable the pawl 62 to be started in its motion by the ratchet 60 is controlled by a series of control mechanisms, two of which are illustrated in Figs. 3, 7 and 12. Each of these mechanisms includes a lever 122 which is arranged to be held in an elevated position, and through connections to be described, to prevent the shaft 100 from being moved by the weight of the parts into a lowered position such as to effect raising of the slide 82. As herein shown, this is accomplished by a locking device including the armature 124 of a magnet 126 arranged to be held in the position shown in Fig. 3 by the electro-magnet 126 until the particular scale with which these parts are associated has made its weight, and opened the circuit to the electro-magnet 126, thus deenergizing the same and permitting the lever 122 to fall, (the high part of its cam 128 having passed from under the cam roll 130). In this manner the shaft 100 may be prevented from turning to effect lifting of the slide 82 so long as any one of the individual levers 122 corresponding to the individual scales 24 and 30 respectively in the machine remain in an elevated position, and such a condition will obtain as long as any particular scale has not completed its weight.

Referring now to Figs. 3, 7 and 12, the cam shaft 66 is provided with a series of cams 132 and 134, one for each of the scales of the machine. As illustrated in Fig. 7, two cams 132 and 134 are shown designed to operate in conjunction with the upper and lower scales of one unit of the machine, and it will be understood that in the illustrated machine there are four sets of mechanisms, duplicates of the two mechanisms about to be described. Each of these cams 132 and 134 operate through the cam rollers 130 and 131 in the under side of the levers 122 to lift the levers 122, and through the contact of cooperating collars to lift the rods 138. One collar 136 is carried by each lever 122 and through which the end of a rod 138 freely extends, and the second collar 140 is threaded and clamped upon the rod 138 so that as a lever 122 is lifted by a cam 132, the collars 136 and 140 operate to lift the rod 138, and through levers 142 to which the upper end of the rods 138 are secured, to rock the shaft 100, each lever 142 being clamped directly to the shaft. The second lever 144 which is provided with the weight 146 and an arm 148 is arranged to rock the shaft 100 through an indirect connection including the contact with a second arm 150 clamped to the shaft 100. This motion of the shaft 100 in an anti-clockwise direction, viewing Fig. 11, and which is effected by the lifting of the levers 122 by the cams 132, 134 is utilized to lower the slide 82 into the path of the tail of the pawl 62 and prevents the pawl 62 from making more than one revolution, throwing it out of engagement with the ratchet 60. The connections between the shaft 100 and the slide 82 include a hub 200, fast to the shaft 100 to rotate therewith, and having an arm 202 which is connected through a spring 204 with a rod 206 secured to an arm 208 formed integrally with a hub 210 loose on the shaft 100. The hub 210 is provided with a second arm 153 constituting one member of a toggle, the second member of which comprises a lever 214 pivoted to and connected to the upper end of the slide 82. Subsequently, in the operation of the machine the shaft 100 is rocked in a clockwise direction, viewing Fig. 11, and the second arm 208 is pulled by the spring 204 operating to move the toggle into its open position and effecting the upward movement of the slide 82 into a position to release the tail of the pawl 62 and effect the engagement of the nose of the pawl 62 with the teeth of the ratchet 60. The slide is then depressed to discontinue the rotation of the cam shaft 66 when it has made one revolution.

After the slide 82 has been depressed, the shaft 100 will then be moved into a position to elevate the slide 82, the weight of the arms 144 and associated parts causing the subsequent movement of the shaft 100 to effect lifting of the slide 82. In order for this to occur, all of the scales of all of the units must have made their weights. The cams 132 and 134 on the cam shaft 66 will be in a position in which the cam rollers 130 and 131 and the levers 122 are free to fall whenever permitted to do so by the opening of the circuit to the electro-magnet 126. The connection with the primary load scale 24, whenever the electro-magnet 126 releases its lever 122, is such as to enable the lever 122 to fall directly. In connection with the drip stream, however, provision is made for stopping the machine in the event that the final weight scale 30 is balanced prematurely due to an overweight. As herein shown, and as best shown in Figs. 3 and 12, a locking pawl 152 is arranged to be reciprocated in timed relation to the movements of the cam shaft 66 through a cam 154, cam roller 156, and lever 158 connected to the cam roller 156 through a rod 160 travelling in suitable guides 162. In this manner, if the locking dog 152 has not cleared the path of movement of the arm 148 by the time that the arm 148 is ready to be moved when the final scale 30 of the machine trips, then the locking dog 152 will lock the arm 148 and prevent the shaft 100 from being moved into a position to elevate the slide 82, thereby stopping the entire machine and calling the operator's attention to the fact that this particular scale is making overweight.

From the foregoing description it will be observed that the shaft 100 is prevented from movement into a position to elevate the slide 82 by any one of the mechanisms including the levers 122 remaining in their elevated position, and these levers 122 will remain in their elevated position until their particular scale has made its weight and a circuit for its electro-magnet 126 has been opened, as will be clear from an inspection of Fig. 3.

Figure 6:
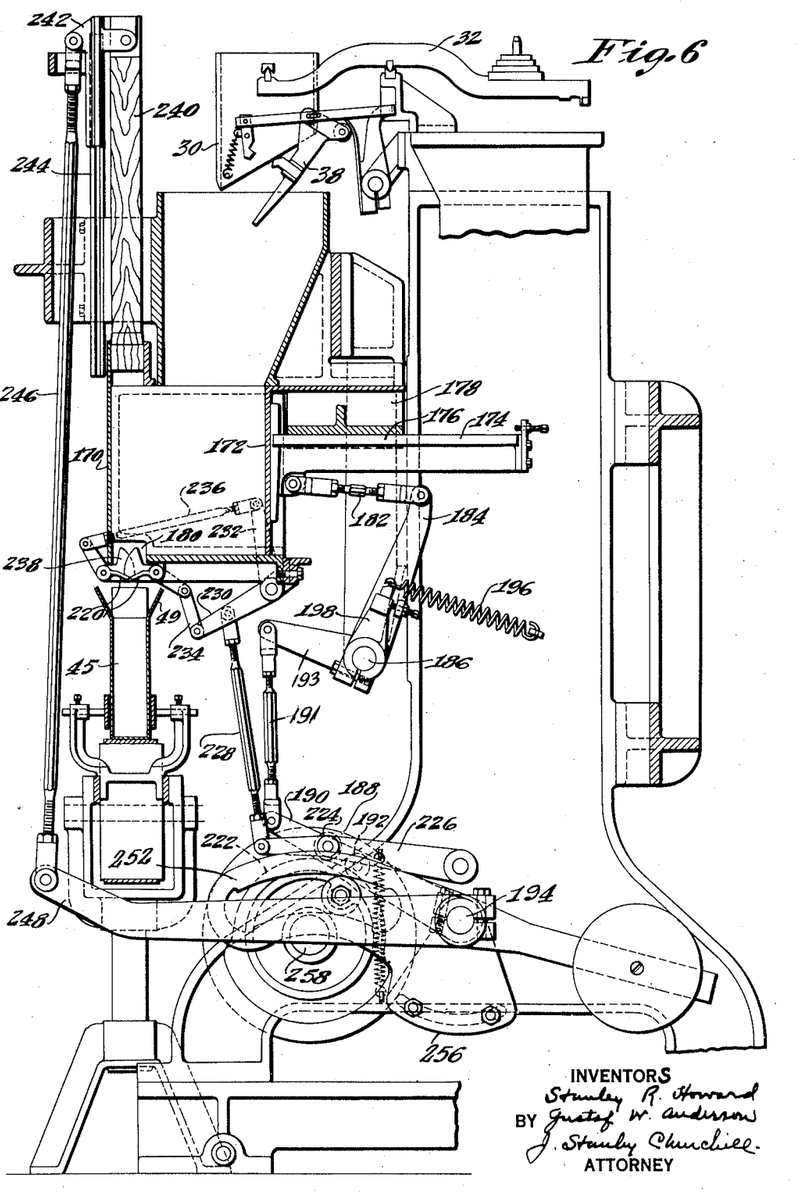
Fig. 6 is a vertical sectional view through one of the units of the machine illustrating the mechanism for compressing the material and introducing it into the container.

Referring now to Fig. 6, when all of the final weight scales 32 have made their weights, the completed loads are discharged from the final weight buckets 30 by the opening of the gates 38 and the weighed loads fall into compression chambers 170 located immediately beneath the final weight buckets 30 for the several units. Provision is made for compressing the loads of material thus deposited in the compression chambers 170, and for this purpose, as herein shown, the rear wall of each compression chamber 170 is formed by an angle bracket 172 secured to the face of a slide member 174 arranged to slide in grooves 176 in a stationary bracket 178 forming part of the machine frame, and during the operation of the machine, the rear wall 172 of the compression chamber 170 is advanced into a position in alignment with a discharge opening 180 to compress the load of material in the chamber 170 in a lateral direction, and for this purpose each slide 174 for each of the individual compression units 170 is connected by a link 182 to a separate lever 184 secured upon a shaft 186. The shaft 186 is arranged to be rocked to effect the desired motion from a cam 188, and by a cam roller 192 mounted upon an arm 190 free on the shaft 194. The arm 190 is connected by a link 191 and arm 193 to the shaft 186. A spring 196 connected to an arm 198 also fixed to the shaft 186 is arranged to return the rear wall 172 of the compression chamber 170 into the position shown in Fig. 6.

Figure 13:
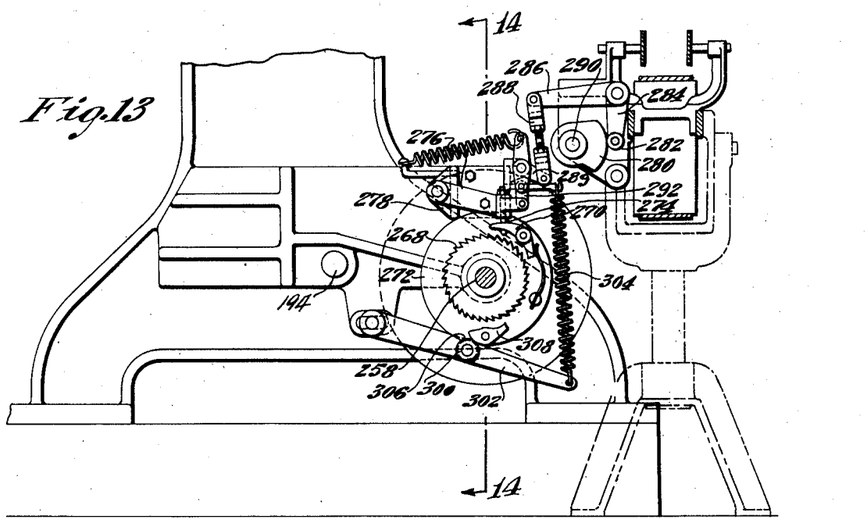
Fig. 13 is a view partly in side elevation and partly in section illustrating the driving mechanism employed in operating the conveyor and compressing mechanism, as will be described.
Figure 14:
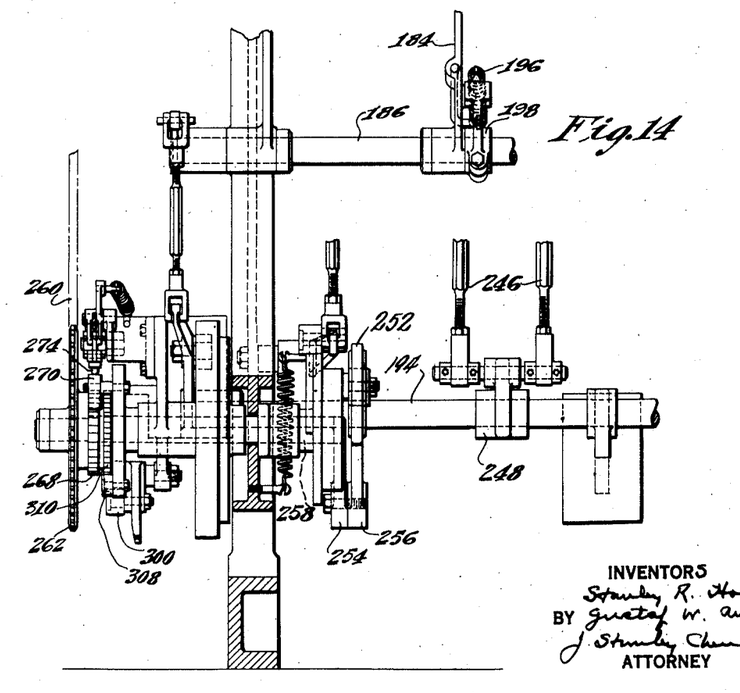
Fig. 14 is a sectional view taken on the line 14—14 of Fig. 13.
Figure 15:
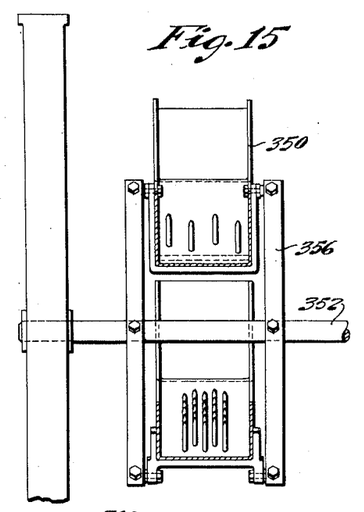
Figs. 15 and 16 are sectional details on lines 15—15 and 16—16 of Fig. 3.
Figure 16:
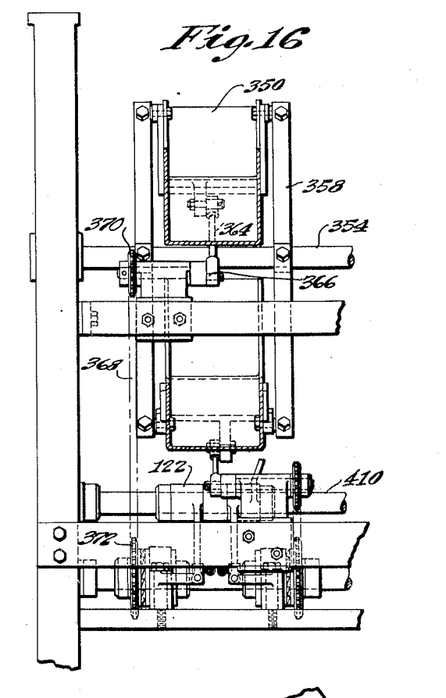

During the operation of the machine, after the weighed loads in the compression chambers 170 have been compressed laterally by the advance of the rear wall 172 into a position in alignment with the discharge opening 180, provision is then made for first opening the gates 220 controlling the discharge of material from the compression chambers 170 and for forcing the column of compressed material down into the package or container 45 which has previously been positioned, as will be described, in alignment with the discharge opening 180. As herein shown, the gate actuating mechanism includes a cam 222, cam roller 224 on the cam arm 226, a link 228, and a system of levers 230, 232 and links 234, 236. The gates 220 themselves are provided with lateral skirts 238, arranged to cooperate to form in effect a funnel when the gates 220 are in open position and to prevent the lateral discharge of material during its passage into the package or container 45. The mechanism for forcing the compressed column of material down into the package 45 includes a reciprocatory block 240 mounted upon a slide 242 and arranged to slide in guideways 244 in the machine frame and connected by a link 246 to a lever 248, fast on the shaft 194, see Figs. 6 and 14. A slotted lever 252 is adjustably connected to the shaft 250 through two segments 254 and 256 adjustably bolted together, as shown in Figs. 6 and 14, and one of which is formed as a part of the lever 252. The lever 252 is arranged to be rocked by motion derived from a shaft 258 driven through a chain 260 and sprockets 262 and 264 connected by the gear train 266 to the motor 84. The sprocket 262 is arranged to be driven continuously and its motion is transmitted to the shaft 258 through a one revolution clutch including the ratchet 268 formed as a part of the sprocket 262 and a pawl 270 mounted on a disk 272 fastened to the shaft 258. Provision is made for controlling the engagement of the pawl 270 with the ratchet 268 by mechanism illustrated in Figs. 13 and 14, including a pawl stop 274 adapted to engage the tail of the pawl 270 and move it so as to cause the nose of the pawl 270 to become disengaged from the ratchet 268. The pawl stop 274 is mounted upon a lever 276 pivoted upon a bracket 278 and the motion of the pawl stop 274 and lever 276 is controlled from a cam 280 through a cam roller 282, cam arm 284, lever 286, links 288 and 289, and toggle 292, as shown in Fig. 13. The cam 280 is mounted upon the conveyor control shaft 290. The conveyor control shaft 290 is directly connected with the main cam shaft 66 controlling the weighing operation through the chain 294 and sprockets 296 and 298 as illustrated. With this arrangement, after the weighing operations have been performed and the scales of all of the units have made their weights, then the cam shaft 66 initiates the operation of opening the gates 38 of the final weight buckets 30, permitting the loads to be deposited into the compression chambers 170. Simultaneously, the conveyor control shaft 290 is started through one revolution and through the connections described, and as illustrated in Fig. 13, the pawl stop 274 is removed from the tail of the pawl 270 and the shaft 250 is arranged to be rocked through the connections above described. The lever 248 also is arranged to be rocked, and through the connections above described, the rear wall 172 of the compression chamber 170 is advanced to compress the goods, and thereafter a vertical block 240 is caused to descend and force the goods down into the container or package 45 previously positioned below the discharge opening 180. The stroke of the block 240 is preferably such as to force the material down into the package 45 sufficiently below the upper end thereof, so that when the block 240 retreats into the position shown in Fig. 6, the material will not expand above the score line of the package, thus enabling the top flaps 49 to be closed without interference from the material. Referring to Fig. 13, the mechanism therein illustrated also includes a roller 300 on an arm 302 yieldingly held against the periphery of the pawl disk 272 by a spring 304 and designed to enter a recess 306 in the periphery of the disk 272 at the end of each single revolution of the pawl disk 272, thereby locking the parts in this position. The disk 272 is also provided with a second pawl 308 to prevent reversal of the disk 272 and this pawl 308 is disengaged from the ratchet 310 when the cam roller 300 enters the recess 306.

Figure 17:
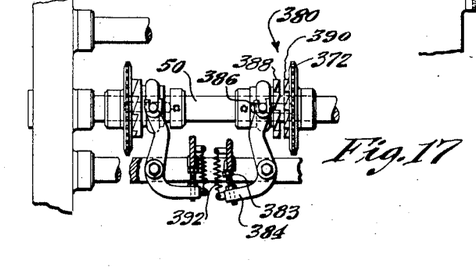
Fig. 17 is a detail in plan of the driving mechanism for oscillating the feed chutes.
Figure 18:
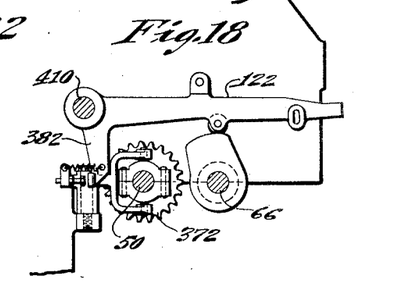
Fig. 18 is a side elevation of the mechanism shown in Fig. 17.
Figure 19:
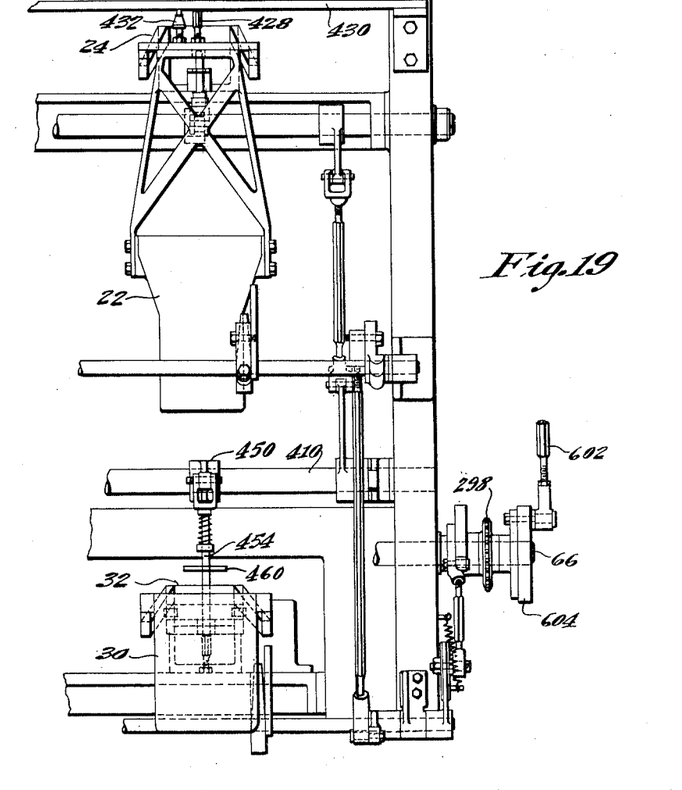
Fig. 19 is a view in front elevation illustrating the resetting mechanism for both the load and drip scales.
Figure 20:
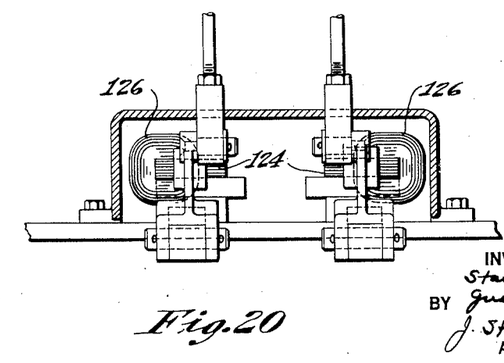

In feeding the material from the supply hopper to the primary and final weight buckets, as illustrated in Fig. 3, each unit of the machine is provided with two chutes having a series of pins upstanding from the bottom of the chutes and which are designed to assist in maintaining the goods in a uniform flowable condition and which cooperate with mechanism for imparting vibration or oscillation to the chutes in order to effect this result. Referring to Fig. 3, each upper or primary load chute 350 is mounted upon two fixed shafts 352, 354, extending lengthwise through the entire machine, by means of laminated wooden strips 356 and 358 bolted to the shafts, and also bolted to brackets 360 and 362 to which the chute 350 is secured, so that the chute 350 is suspended upon the laminated wooden strips 356, 358 in a condition capable of being vibrated or oscillated. Provision is made for effecting vibration of each chute 350 during the periods in the operation of the machine when the goods are to flow through the chutes 350, and for this purpose each chute 350 is operatively connected through a connecting rod 364 to a crank 366 arranged to be revolved from a continuously driven shaft 50 through a chain 368 and cooperating sprockets 370 and 372 and a clutch 380, illustrated in detail in Figs. 17 and 18. Each clutch operating mechanism includes a depending arm 382 forming a part of the lever 122 of the particular unit, and the arm 382 is arranged to engage a stop screw 383 on a bent lever 384 which has a bifurcated end 386 arranged to cooperate with and effect the movement of a driving member 388 of the clutch 380. The driven member 390 of the clutch 380 is connected directly through the sprocket 372 which is free on the shaft. In this manner the rotations of the shaft 50 are transmitted through the clutch members 388, 390 to the sprocket 372 and thence through the chain 368 to the crank 366 effecting oscillation of the chute 350 which is as above stated flexibly supported by the laminated strips 356, 358, so that in the operation of the machine when each lever 122 is raised by its cam 132 on the shaft 66, the movement of the part 382 away from the set screw 383 permits the spring 392 to move the movable member 388 of the clutch 380 into engagement with the driven member 390, and when the lever 122 descends and the scale 24 has made its weight, then the part 382 operating through the set screw 383 and bent lever 384 throws out the clutch 380 and discontinues the vibration of the chute.

Figure 5:
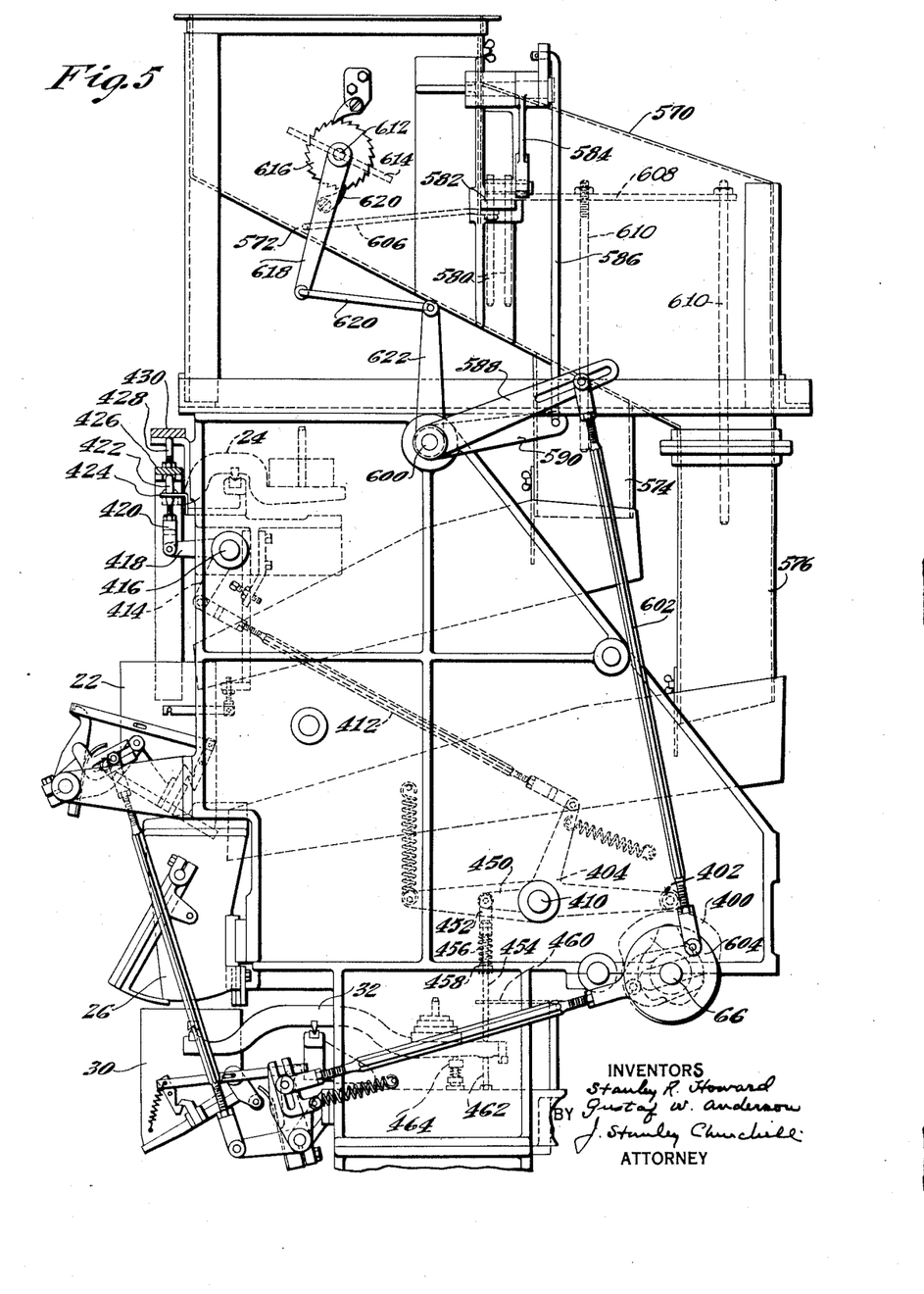
Fig. 5 is a side elevation of the portion of the machine shown in section in Fig. 3.

Provision is made in the illustrated machine for resetting both the primary and the final weight scales, and as illustrated in Fig. 5, the resetting operations are performed by mechanism deriving motion from a cam 400 on the one revolution shaft 66. The mechanism for resetting the upper or primary load scale 24 includes a cam roller 402 cooperating with the cam 400, a bell crank 404 secured to a shaft 410 and connected by a link 412 and lever 414 to a shaft 416. The shaft 416 has a plurality of arms 418, one for each primary load scale secured thereto. Each arm 418 has pivoted at its outer end a connecting member 420 having a stud 422 in its upper end arranged to extend through guide plates 424 and to engage the under surface of the crosspiece 426 of framework by which each primary load bucket is suspended upon its scale. The upper surface of the cross-piece 426 is provided with a stud 428 designed to engage the under surface of a crossbar 430 forming a part of the machine frame. A resilient bumper 432 is preferably provided for cushioning the blow when the stud 428 engages the crossbar 430. With this arrangement, while the scale is reset, the stud 428 is held against the rigid crossbar 430 by the cam 400 through the connections described. The resetting mechanism for the lower or final weight scales includes, as illustrated in Fig. 5, a plurality of levers 450 secured to the shaft 410, and each lever is provided with a depending member 452 having an elongated stud 454 mounted therein, and a resilient connection is provided between the member 452 and the stud 454 by a spring 456 cooperating at its upper end with the member 452 and at its lower end with a collar 458 attached to the stud 454. The stud extends through and is guided by a guide plate 460, and the lower end of the stud is arranged to engage the upper surface of the scale beam 32 of the final weight scale to hold it against a rigid stud 462, during the resetting of the scale, as shown in Fig. 5. A resilient bumper 464 is provided for cushioning the blow of the resetting mechanism on the scale beam, and as illustrated in Fig. 3, it is preferred to operatively connect the movable member 466 of a dash pot 468 with the scale beam so as to control its movement and prevent oscillation of the scale beam during the weighing operation, the structure forming per se no part of the present invention, but may comprise that illustrated in the patent of Stanley R. Howard, No. 1,893,622, to which reference may be made.

In the illustrated machine, as illustrated in Fig. 2, the four units making up the machine are assembled in two groups which may for convenience of description be referred to as group No. 1 and group No. 2. These groups are spaced apart, and provision is made for automatically positioning the containers or packages 45 in operative filling position beneath the discharge openings 180 leading from the compression chambers 170 above referred to, and as herein shown this mechanism includes an endless belt conveyor 47 running around pulleys, one of which is driven from the main driving motor 84 of the machine (see Fig. 2) through connections including the chain 470 and a pair of sprockets 472 and 474 mounted upon the shafts 476, 478 respectively. The sprocket 474 is loose on the shaft 478, and connection is made with the shaft through a pair of clutch members 480, 482. The member 482 is the movable member of the clutch and is arranged to be thrown into and out of engagement with the other member 480 of the clutch by mechanism including a lever 484 pivoted upon a bracket 486 and actuated from a cam 488 through a cam roll 490, cam lever 492 and connecting link 494. The cam 488 is mounted upon the conveyor control shaft 290 above referred to, which as above described is driven from the one revolution shaft 66 in timed relation to the various other operations of the machine controlled by such shaft 66. As a result, whenever the control shaft 290 is rotated through a single revolution, the conveyor belt 47 is arranged to be driven through the connections described a predetermined distance regulated by the cam 488.

Provision is made for controlling the movement of the incoming containers or packages 45 along the incoming conveyor 47, and for this purpose there is provided a series of stop members. As illustrated in Figs. 2, 21 and 22, the movement of the packages or containers is controlled by two stop members 500, 502, designed to engage and hold the first package or container of each group being fed by the conveyor 47 into operative relation to the discharge outlets 180 from the compressing chambers 170 above referred to, and by reference to Fig. 2, it will be observed that the stop 500 is positioned to the left of the filling units a distance such that when four packages are held by engagement of the stop 500 with the first package, the last two packages of the group will be correctly positioned under the discharge outlets 180 above referred to of the first two filling units making up group 1 of the machine, permitting the containers to be filled by the units of group 1. At the same time, the stop member 502 is so located as to operatively position the first two packages of the line of packages being held by the stop in operative filling position under the filling units comprising group No. 2. In addition to the stops 500, 502, a third stop 504 is provided which is arranged to be moved into engagement with the side of the fifth package in the line being held against the stop 502 and to pinch such fifth package between the stop 504 and the adjacent guide rail to hold the fifth and remaining packages from being advanced by the conveyor. As a result, when the fifth package is thus held and the stops 500 and 502 are withdrawn, the belt conveyor 470 operates to permit the four packages to pass from the position in engagement with the stop 502 where the first two packages have been filled by the filling units of group No. 2 to a position where the first package is engaged by the stop 500, thus presenting the third and fourth packages in operative position under the filling units of group 1. Thereafter, the member 504 is withdrawn, permitting a fresh line of packages to be conveyed into a position where the first package engages the stop 502.

Figure 26:
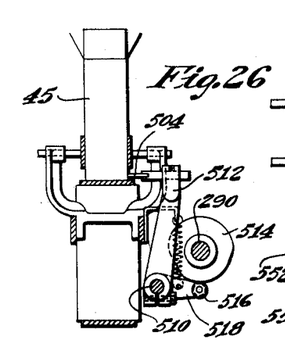
Figs. 26 to 30 are details to be referred to, in section and elevation of portions of the conveyor and control mechanism.

The mechanism for effecting movement of the stop members 500, 502, and 504 will now be described. Both of the stop members 500, 502, are mounted upon a shaft 506, being secured in the upper ends of arms clamped to the shaft 506 and provision is made for rocking the shaft 506 through a cam 508 on the one revolution control shaft 290 to reciprocate the stop members at the desired time into and out of operative package engaging position. The shaft 506 terminates in the bearing 509. A second and separate actuating shaft 516 is provided for operating the member 504, and as shown in detail in Fig. 26, the member 504 is mounted upon an arm 512 clamped to the shaft 516, and the shaft 516 is arranged to be rocked from a cam 514 on the one revolution conveyor control shaft 290 through the cam roll 516 and cam arm 518.

Figures 27, 28:
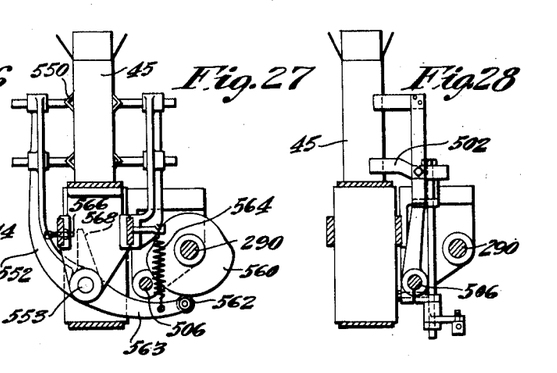
Figure 29:
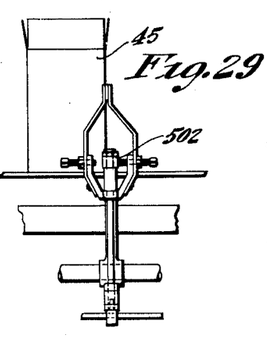
Figure 30:
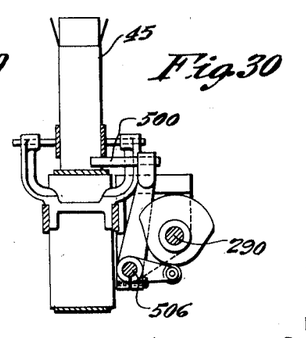
Figure 31:
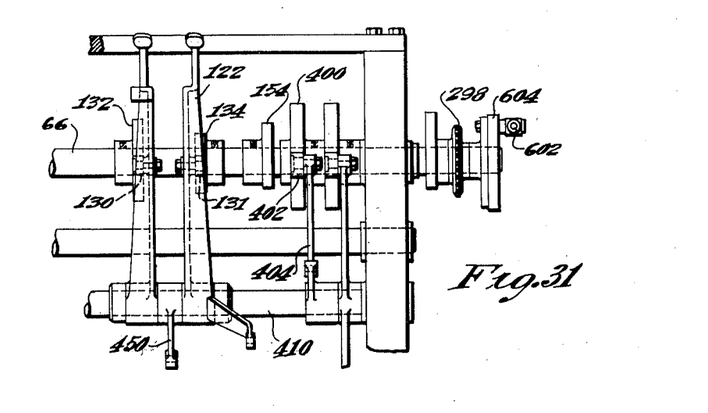
Fig. 31 is a plan illustrating one set of the various operating cams for operating and controlling a unit of the machine.

In order to accurately position the packages while being filled, a section of the outside guide rail is movably mounted and provision is made for moving it toward the inner guide rail to clamp the packages being filled in accurate position during the filling operation, and as illustrated in Fig. 27, the section 550 of the outer guide rail is carried by an arm 552 fast on the shaft 553 and arranged to be rocked to move the section 550 of the rail in and out through a cam 560, cam roll 562, and arm 563, secured to the shaft 553. The spring 564 holds the cam roll 562 against the cam 560, and effects the outward movement of the rail when such movement is permitted by the cam. A stop screw 566 is provided for cooperating with an arm 568 on the shaft 553 to limit the outward movement of the parts.

Referring now to Fig. 5, the supply hopper 570 for storing a bulk supply of the goods to be weighed is provided with a downwardly inclined bottom wall 572 which terminates in two discharge pipes 574, 576, leading to the primary and final weight chutes of the weighing mechanism. It will be understood that there are two sets of pipes for each weighing unit. Provision is made for agitating the material in the supply hopper 570, and in the upper end of said pipes in order to prevent arching of the material over the mouth of the pipes and clogging of the material in the supply hopper, and as herein shown three sets of agitating members are provided and arranged to be operated simultaneously from a single actuating mechanism. As shown in Figs. 2 and 5, two rows of spaced pins 580 are mounted to depend from a reciprocatory bar 582 arranged to slide in suitable bearings transversely of the supply hopper. Provision is made for reciprocating the bar 582, and as herein shown, the bar is connected through a bell crank 584 and connecting rod 586 and through the two levers 588 and 590 secured upon a single shaft 600 and through a connecting rod 602, to a crank 604 mounted upon the end of the one revolution shaft 66, so that during the revolution of the shaft 66, the bar 582 is reciprocated back and forth through the hopper 570 and the goods along the bottom of the hopper in the vicinity of the pins are agitated. The bar 582 is also provided with a series of spaced and laterally projecting agitating rods or members 606 designed to sweep across the upper portion of the inclined bottom wall 572 of the hopper 570 to agitate and prevent clogging of the goods in this region. In addition, the bar 582 is provided with a supporting member 608 projecting laterally therefrom to reciprocate therewith and from which depending agitating members or rods 610 are arranged to extend down into the mouth and upper portion of each of the supply pipes, 574, 576, as shown in Fig. 5, so that during the reciprocation of the bar 582 arching of the material over the mouth of these supply pipes is prevented.

In addition to the agitating devices above described in the main body of the supply hopper, there is preferably provided a rotary stirring member, herein shown as comprising a rod 612 provided with a series of short pins 614. The end of the rod 612 projects through the hopper and is provided with a ratchet 616 secured thereto, and with an arm 618 mounted to turn thereon. The arm 618 is provided with a pawl 620 arranged to engage the ratchet 616 to advance the same and rotate the stirrers as the arm 618 is oscillated, and the lower end of the arm is connected by a link 620 to an arm 622 secured upon the shaft 600, which is arranged to be oscillated as above described through the levers 588 connecting rod 602 and crank 604.

Figure 32:
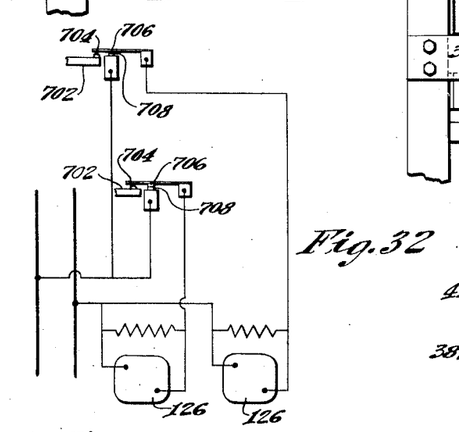

Referring to Figs. 3, 4 and 32, the electrical connections for each unit of the machine between the scale beams of each unit and the electro-magnet 126 for locking each lever 122 in its elevated position, as above described, includes a contact box 700 of the construction commonly used in connection with automatic weighing machines, and which is provided with a stationary and a movable contact. The end of the scale beam 702 is arranged to project into the contact box, and when the weight is made, to elevate the movable contact member 704 and break the circuit at the points 706, 708. The contact members are included in one side of the circuit to the electro-magnet 126 illustrated in Fig. 3, and when the circuit is broken the magnet 126 is deenergized. The circuit is closed again at the contact members when each scale is reset in the manner above described. The wiring diagram for these electrical connections is shown in Fig. 32.

Briefly the operation of the machine may be described as follows: Assuming that the machine is supplied with material and the packages 45 are in position on the conveyor belt 47 and the machine has just completed one cycle of operation the first operation to be performed when the cam shaft 66 starts its new cycle is to lock the scale beams 24, 32 and release the previously weighed loads in the buckets 22, 30. The primary weighed loads in the buckets 22 are emptied into the intermediate buckets 26, the shutter arm 36 being closed at this time, and the final weighed loads in the buckets 30 are emptied into the compressing chambers 170. Immediately thereafter the gates 34, 38 on the buckets 22, 30 respectively, are closed, and the scale beams 24, 32 are unlocked in preparation for another weighing operation.

The levers 122 are now reset by the cams 132, 134 so that the armatures 124 are brought into contact with their magnets 126 and the shutter arms 36 are moved through connections from the arms 122 to open the bottom of the buckets 26 which releases the material weighed during the previous cycle from the buckets 26 into the final weight buckets 30. Through further connections from the arms 122 the flow of material through the chutes 350 is initiated, the gates 35 in the upper feed chutes are opened and the control shaft 100 is rocked to return the pawl stop 82 into operative position to disengage the pawl 62 from its ratchet 60 at the end of its revolution.

The material continues to flow through the feed chutes 350 into the buckets 22, 30 as long as the connections from the arms 122 hold the clutches 380 in operative engagement and the arms 122 remain in this position until the weights in the buckets 22, 30 are reached whereupon the contacts 706, 708 at the end of the scale beams 24, 32 are opened to release the armatures 124 from their magnets 126. The releasing of the armatures 124 from the magnets 126 permits the arms 122 to be rocked to their non-weighing position and as each weighing unit is independently mounted it will be apparent that each individual resetting arm 122 will be released when the weight in its respective weighing bucket 22 or 30 has been reached and obviously the tripping of each individual scale may occur at a different time. In other words, the tripping of the scales 24, 30 and consequently the releasing of the arms 122 does not take place simultaneously. Therefore, as it is desirable to have all the scales start a new weighing cycle at the same time, the connections 138 from each arm 122 to the control shaft 100 are provided. These connections are arranged so that if any one of the scales remains in weighing position the shaft 100 will not be rocked but as soon as the last scale makes its weight, all of the obstructions to prevent the rocking of the shaft will have been removed and the pawl stop 82 will be removed from engagement with the pawl 62 and the one revolution clutch 40 is permitted to make another revolution to start a new cycle of operations, providing, of course, that the connections from the package moving mechanism have previously caused the pawl stop 80 to be removed, as will be described.

It will be apparent that the releasing of the arms 122 operates to close the shutters 36 of the buckets 26, to disengage the material feeding clutches 380 and to close the gates 35 at the mouth of the upper chutes 350 and that these events occur individually and separately as each scale makes its weight.

From an inspection of Fig. 5, it will be apparent that the agitators 606, 614 in the supply hoppers 570 operate during the entire weighing cycle of the machine, being actuated by a crank at the end of the cam shaft 66.

In the compressing, plunging and package moving cycle of operations, it will be seen that at the start of a new cycle, after the loads in the final weighing buckets 30 are emptied into the compressing chambers 170 the material will be compressed and the compressed material will be transferred from the chambers 170 into the packages 45, through connections from the cam shaft 258. The rotation of the cam shaft 258, as hereinbefore described, is initiated through connections from the conveyor control shaft 290 which, as has been described, is driven directly from the main cam shaft 66 so that the compressing mechanism and the delivery of the material into the containers of the various units operate in timed relation. After the plungers 240 have forced the material into the packages 45 and have thereafter been withdrawn, the belt conveyor 47 is started in operation through the engagement of the clutch members 480, 482, which are controlled by the cam shaft 290. Movement of the belt 47 operates to carry the filled packages out of the machine and to present a new set of packages under the compression chambers 170 to receive the next load during a succeeding cycle. In order to align the packages under the chambers 170 and in order to separate the packages into groups of four to accommodate the spacing of the chambers 170, a series of stop members 500, 502 and 504 are provided. These stops are actuated by cams on the shaft 290 and at the proper time in the operation of the machine the stops 500, 502 are withdrawn. By referring to Fig. 2 it will be seen that group 1 will be carried away from the machine and group 2 will be advanced to the position previously occupied by group 1. After group 1 has been advanced beyond the stop 500, the stop will be returned to the path of the incoming group 2. Likewise after group 2 has been advanced beyond the stop 502 it is again returned into the path of the next succeeding group of packages which are released from the main group by withdrawal of the stop 504. The stop 504 returns to package holding position to retain the packages in the line until the next cycle is completed.

In order that a new cycle of operations may not be permitted to start until the packages are in position to receive the succeeding compressed loads, connections are provided from the conveyor to the pawl stop 80. The withdrawal of the pawl stop 80 is effected when group 2 comes in contact with the stop 502 through the connections hereinbefore described. Thus the machine is ready for a new cycle of operations when both pawl stops 80, 82 are withdrawn from engagement with the pawl 62.

While the preferred embodiment of the invention has been herein illustrated and described, it will be understood that the invention may be embodied in other forms within the scope of the following claims.

Having thus described the invention, what is claimed is:—

1. In a packaging machine, in combination, weighing mechanism including three superposed buckets, a scale upon which the upper bucket is mounted, a second scale upon which the lower bucket is mounted, all of said buckets being provided with gates in the bottom thereof, gate operating mechanism, means for introducing a drip stream into the lower bucket through the intermediate bucket when the gate for the latter is opened, package moving means and control mechanism for controlling the gate operating mechanism to effect the closing of the lower bucket before the intermediate bucket is opened and package moving means from the weighing mechanism.

2. In a packaging machine, in combination, weighing mechanism including three superposed buckets, a scale upon which the upper bucket is mounted, a second scale upon which the lower bucket is mounted, all of said buckets being provided with gates in the bottom thereof, gate operating mechanism, package moving means and control mechanism for controlling the gate operating mechanism to effect the closing of the lower bucket before the intermediate bucket is opened and package moving means from both the incoming packages and weighing mechanism.

3. In a packaging machine, in combination, a plurality and at least three buckets arranged in superposed relation, and each provided with a discharge gate in the bottom thereof, a primary weight scale upon which the upper bucket is mounted, a final weight scale upon which the lower bucket is mounted, means for introducing a primary load into the upper bucket, means for delivering a drip stream into the intermediate bucket, and when its gate is open through the same and into the final weight bucket, gate operating mechanism and connections between the gate operating mechanism and the final weight scale for maintaining the intermediate bucket gate open while the final load is being weighed into the lower bucket, and for immediately closing the intermediate bucket gate when the final weight scale makes its weight.

4. In a packaging machine, in combination, a plurality of units, each unit including a plurality and at least three buckets arranged in superposed relation, and each provided with a discharge gate in the bottom thereof, a primary weight scale upon which the upper bucket is mounted, a final weight scale upon which the lower bucket is mounted, means for introducing a primary load into the upper bucket, means for introducing a drip stream into the intermediate bucket, and when its gate is open through the same and into the final weight bucket, gate operating mechanism for operating the gates of all of the buckets of each unit to effect the closing of the lower bucket before the opening of the intermediate bucket, and connections between the gate operating mechanism and the final weight scale of each unit for maintaining the gate for the intermediate bucket open during the weighing of the final load in the lower bucket, and for closing said gate when the final weight scale makes its weight, and package moving means rendered operative when and only when all of the final weight scales of all of the units have completed their weights.

5. In a packaging machine, in combination, a plurality of units, each unit including a plurality and at least three buckets arranged in superposed relation, and each provided with a discharge gate in the bottom thereof, a primary weight scale upon which the upper bucket is mounted, a final weight scale upon which the lower bucket is mounted, means for introducing a primary load into the upper bucket, means for introducing a drip stream into the intermediate bucket, and when its gate is open through the same and into the final weight bucket, gate operating mechanism for operating the gates of all of the buckets of each unit to effect the closing of the lower bucket before the opening of the intermediate bucket, and connections between the gate operating mechanism and the final weight scale of each unit for maintaining the gate for the intermediate bucket open during the weighing of the final load in the lower bucket, and for closing said gate when the final weight scale makes its weight, and means located beneath the lower bucket to receive the weighed loads therefrom for compressing the weighed loads, package moving means, and means for controlling operation of said compressing and package moving means to render them operative when and only when all of the final weight scales of all of the units have completed their weights.

6. In a packaging machine, in combination, a plurality of units each comprising a final weight scale, a primary weight scale and material feeding means for feeding material to both scales, package moving means, and means controlling the movement of the packages into operative position with relation to the final weight scales, said means operating to permit movement of the packages when and only when the final weight scales of all of the units have made their weights.

7. In a packaging machine, in combination, a plurality and at least three buckets arranged in superposed relation and each provided with a discharge gate in the bottom thereof, a primary weight scale upon which the upper bucket is mounted, a final weight scale upon which the lower bucket is mounted, means for introducing a primary load into the upper bucket, means for delivering a drip stream into the intermediate bucket, and when its gate is open through the same and into the final weight bucket, and gate operating mechanism having provision for effecting the closing of the lower bucket before the opening of the intermediate bucket.

STANLEY R. HOWARD.
GUSTAF WALDEMAR ANDERSON.